(12) United States Patent
Wang et al.

(10) Patent No.: US 12,309,082 B2
(45) Date of Patent: *May 20, 2025

(54) BASE STATION, USER EQUIPMENT AND WIRELESS COMMUNICATION METHOD

(71) Applicant: Panasonic Intellectual Property Corporation of America, Torrance, CA (US)

(72) Inventors: Lilei Wang, Beijing (CN); Hidetoshi Suzuki, Kanagawa (JP); Alexander Golitschek Edler Von Elbwar, Hessen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/430,452

(22) Filed: Feb. 1, 2024

(65) Prior Publication Data
US 2024/0171330 A1    May 23, 2024

Related U.S. Application Data

(63) Continuation of application No. 17/974,448, filed on Oct. 26, 2022, now Pat. No. 11,929,949, which is a
(Continued)

(51) Int. Cl.
*H04L 5/00*        (2006.01)
*H04L 27/26*       (2006.01)
(Continued)

(52) U.S. Cl.
CPC ............ *H04L 5/0046* (2013.01); *H04L 5/005* (2013.01); *H04L 5/0053* (2013.01);
(Continued)

(58) Field of Classification Search
CPC . H04W 72/02; H04W 72/0406; H04W 72/12; H04W 72/0446; H04W 72/046; H04L 5/005; H04L 5/0053
See application file for complete search history.

(56) References Cited

U.S. PATENT DOCUMENTS 8,855,132 B2   10/2014 Lohr et al.
9,768,939 B2    9/2017 Seo et al.
(Continued)

FOREIGN PATENT DOCUMENTS

CN    102711248 A    10/2012
CN    102714586 A    10/2012
(Continued)

OTHER PUBLICATIONS

3GPP TS 36.212 V14.0.0, "3rd Generation Partnership Project; Technical Specification Group Radio Access Network; Evolved Universal Terrestrial Radio Access (E-UTRA); Multiplexing and channel coding (Release 14)," Sep. 2016, 148 pages.
(Continued)

*Primary Examiner* — Raj Jain
(74) *Attorney, Agent, or Firm* — Seed IP Law Group LLP

(57) ABSTRACT

An integrated circuit includes generation circuitry and transmission circuitry. The generation circuitry uses a reference size for a search space to generate downlink control information (DCI) in a first DCI format used for sidelink communications. The transmission circuitry transmits the DCI in the first DCI format mapped on the search space. When a second DCI format used for base station communications is mapped on the search space and the second DCI format is larger than the first DCI format, the reference size for the search space is based on the second DCI format. When a third DCI format used for sidelink communications is mapped on the search space and the third DCI format is larger than the first DCI format, and the second DCI format
(Continued)

larger than the third DCI format is not mapped on the search space, the reference size is based on the third DCI format.

10 Claims, 3 Drawing Sheets

Related U.S. Application Data continuation of application No. 16/928,631, filed on Jul. 14, 2020, now Pat. No. 11,516,793, which is a continuation of application No. 16/326,520, filed as application No. PCT/CN2016/104448 on Nov. 3, 2016, now Pat. No. 10,750,490.

(51) Int. Cl.
| | | |
|---|---|---|
| *H04W 72/044* | (2023.01) | |
| *H04W 72/0446* | (2023.01) | |
| *H04W 72/12* | (2023.01) | |
| *H04W 72/23* | (2023.01) | |
| *H04W 92/18* | (2009.01) | |
| *H04L 1/00* | (2006.01) | |

(52) U.S. Cl.
CPC ..... *H04L 27/2602* (2013.01); *H04W 72/0446* (2013.01); *H04W 72/046* (2013.01); *H04W 72/1215* (2013.01); *H04W 72/23* (2023.01); *H04W 92/18* (2013.01); *H04L 1/0008* (2013.01)

(56) References Cited

U.S. PATENT DOCUMENTS

| | | | |
|---|---|---|---|
| 9,883,513 | B2 | 1/2018 | Patil et al. |
| 10,070,472 | B2* | 9/2018 | Ko .................. H04L 1/1861 |
| 10,356,803 | B2 | 7/2019 | Kim et al. |
| 10,750,490 | B2 | 8/2020 | Wang et al. |
| 11,516,793 | B2* | 11/2022 | Wang .................. H04W 92/18 |
| 2011/0171985 | A1 | 7/2011 | Papasakellariou et al. |
| 2012/0176885 | A1 | 7/2012 | Lee et al. |
| 2012/0309402 | A1 | 12/2012 | Cheng et al. |
| 2013/0010709 | A1 | 1/2013 | Earnshaw et al. |
| 2013/0016655 | A1 | 1/2013 | Heo et al. |
| 2014/0023008 | A1* | 1/2014 | Ahn .................. H04W 76/14 370/329 |
| 2014/0307672 | A1 | 10/2014 | Papasakellariou et al. |
| 2015/0071207 | A1 | 3/2015 | Seo et al. |
| 2015/0245346 | A1 | 8/2015 | Yokomakura et al. |
| 2016/0073408 | A1* | 3/2016 | Sartori .............. H04W 72/0453 370/329 |
| 2016/0128034 | A1* | 5/2016 | Choi .................. H04L 1/1854 370/329 |
| 2017/0142692 | A1 | 5/2017 | Kim et al. |
| 2017/0230915 | A1 | 8/2017 | Kim et al. |
| 2017/0245313 | A1 | 8/2017 | Kim et al. |
| 2018/0006791 | A1* | 1/2018 | Marinier .................. H04L 1/003 |
| 2018/0176892 | A1* | 6/2018 | Kim .................. H04W 52/04 |
| 2018/0263026 | A1* | 9/2018 | Loehr .................. H04W 72/02 |
| 2018/0338319 | A1 | 11/2018 | Kim et al. |
| 2019/0053203 | A1* | 2/2019 | Xu .................. H04W 88/04 |
| 2019/0191424 | A1 | 6/2019 | Wang et al. |
| 2020/0344735 | A1 | 10/2020 | Wang et al. |
| 2024/0171330 | A1* | 5/2024 | Wang .................. H04L 5/005 |

FOREIGN PATENT DOCUMENTS

| | | |
|---|---|---|
| CN | 102859956 A | 1/2013 |
| EP | 3422788 A1 | 1/2019 |
| EP | 3509379 A1 | 7/2019 |
| RU | 2 527 749 C2 | 9/2014 |
| WO | WO 2010050784 A2 | 5/2010 |
| WO | WO 2011028079 A2 | 3/2011 |
| WO | WO 2011074807 A2 | 6/2011 |
| WO | WO 2011082531 A1 | 7/2011 |
| WO | WO 2012161540 A2 | 11/2012 |
| WO | WO 2016021949 A1 | 2/2016 |
| WO | WO 2016165124 A1 | 10/2016 |

OTHER PUBLICATIONS

CMCC, "Discussion on SL-SPS DCI and cross carrier scheduling," 3GPP TSG RAN WG1 Meeting #86bis, R1-1609290, Agenda Item: 7.2.1.1.1, Lisbon, Portugal, Oct. 10-14, 2016, 5 pages.

CMCC, "Discussion on SPS Configurations," 3GPP TSG RAN WG1 Meeting #85, R1-164878, Agenda Item: 6.2.2.3.1, Nanjing, China, May 23-27, 2016, 4 pages.

English Translation of Russian Search Report dated Mar. 2, 2020 for the related Russian Patent Application No. 2019104742, 2 pages.

Extended European Search Report dated Sep. 23, 2019 for the related European Patent Application No. 16920670.3.

Indian Examination Report dated Nov. 22, 2021 for the Indian Patent Application No. 201947005960.

International Search Report of PCT application No. PCT/CN2016/104448 dated Jul. 27, 2017. [2 pages].

LG Electronics, "Remaining details of (E)PDCCH design of scheduling for sidelink resource," R1-166830, Agenda Item: 7.2.2.4.1, 3GPP TSG RAN WG1 Meeting #86, Gothenburg, Sweden, Aug. 22-26, 2016, 4 pages.

LG Electronics, ZTE, Samsung, CATT, Huawei, HiSilicon, "WF on DCI design for SL SPS," 3GPP TSG RAN WG1 Meeting #86bis, R1-1610813, Agenda Item: 7.2.1.1.1, Lisbon, Portugal, Oct. 10-14, 2016, 6 pages.

NTT Docomo, "Multiple SPS support for sidelink and uplink V2X," R1-1610037, Agenda Item: 7.2.1.1.1, 3GPP TSG RAN WG1 Meeting #86bis, Lisbon, Portugal, Oct. 10-14, 2016. (6 pages).

Panasonic, "Discussion on DCI design in V2V," R1-166970, Agenda Item: 7.2.2.4.1, 3GPP TSG RAN WG1 Meeting #86, Gothenburg, Sweden, Aug. 22-26, 2016, 4 pages.

Panasonic, "Signalling design on supporting SPS for slidelink transmission mode 3," R1-1609570, Agenda Item: 7.2.1.1.1, 3GPP TSG RAN WG1 Meeting #86bis, Lisbon, Portugal, Oct. 10-14, 2016. (2 pages).

* cited by examiner

BASE STATION, USER EQUIPMENT AND WIRELESS COMMUNICATION METHOD

BACKGROUND

1. Technical Field

The present disclosure relates to the field of wireless communication, and in particular, to a base station (eNodeB), a user equipment (UE) and wireless communication methods related to DCI (Downlink Control Information) design for blind detection.

2. Description of the Related Art

Dynamic scheduling of sidelink (SL) transmission according to an eNodeB based scheduling resource allocation mode has been specified for V2V (Vehicle to Vehicle) communication so far and a sidelink DCI format has been designed for the dynamic scheduling of sidelink. FIG. 1 schematically shows an exemplary scenario in which sidelink resources are dynamically scheduled by an eNodeB for V2V communication. As shown in FIG. 1, communication may be performed between two vehicles 102 and 103 via sidelinks as shown by two thick arrows noted as "SL". The resources for sidelink transmission between the vehicles 102 and 103 may be dynamically scheduled by eNodeB 101 through the sidelink DCI format as described above. Specifically, communication may also be performed between each of two vehicles 102 and 103 and eNodeB 101 as shown by respective thin arrows noted as "DL" or "UL". For example, the vehicle 102 may receive the sidelink DCI from eNodeB 101 via downlink so as to perform the communication with the vehicle 103 via sidelinks based on the received sidelink DCI.

Based on latest 3GPP (The 3rd Generation Partnership Project) progress, semi-persistent scheduling (SPS) would be supported for V2V sidelink transmission in order to satisfy periodic traffic like CAM (Cooperative Awareness Message). Thus, sidelink SPS and the dedicated DCI format thereof are under discussion in 3GPP.

SUMMARY

One non-limiting and exemplary embodiment provides DCI design to reduce blind detection times.

In a first general aspect of the present disclosure, there is provided a base station, comprising: circuitry operative to align, for each DCI (Downlink Control Information) of a first group of DCIs, one of the size of the DCI of the first group and the size of a selected DCI of a second group of DCIs with the other, if the size of the DCI of the first group is different from the size of each DCI of the second group of DCIs, wherein the selected DCI of the second group is a DCI whose size is closest to the size of the DCI of the first group among DCIs of the second group having sizes larger than the size of the DCI of the first group or a DCI whose size is closest to the size of the DCI of the first group among DCIs of the second group having sizes smaller than the size of the DCI of the first group; and a transmitter operative to transmit the first group of DCIs and the second group of DCIs after the size alignment by the circuitry to a user equipment, wherein the size alignment is based on a rule which is known by the base station and the user equipment beforehand.

In a second general aspect of the present disclosure, there is provided a user equipment, comprising: a receiver operative to receive a first group of DCIs and a second group of DCIs from a base station; and a circuitry operative to blindly detect the first group of DCIs and the second group of DCIs so as to perform transmission and/or reception based on a rule which is known by the base station and the user equipment beforehand, wherein said rule indicates that before being received by the user equipment, the first group of DCIs and the second group of DCIs has been subject to size alignment comprising: aligning, for each DCI of the first group of DCIs, one of the size of the DCI of the first group and the size of a selected DCI of the second group of DCIs with the other based on said rule, if the size of the DCI of the first group is different from the size of each DCI of the second group of DCIs, wherein the selected DCI of the second group is a DCI whose size is closest to the size of the DCI of the first group among DCIs of the second group having sizes larger than the size of the DCI of the first group or a DCI whose size is closest to the size of the DCI of the first group among DCIs of the second group having sizes smaller than the size of the DCI of the first group.

In a third general aspect of the present disclosure, there is provided a wireless communication method for a base station, comprising: aligning, for each DCI (Downlink Control Information) of a first group of DCIs, one of the size of the DCI of the first group and the size of a selected DCI of a second group of DCIs with the other, if the size of the DCI of the first group is different from the size of each DCI of the second group of DCIs, wherein the selected DCI of the second group is a DCI whose size is closest to the size of the DCI of the first group among DCIs of the second group having sizes larger than the size of the DCI of the first group or a DCI whose size is closest to the size of the DCI of the first group among DCIs of the second group having sizes smaller than the size of the DCI of the first group; and transmitting the first group of DCIs and the second group of DCIs after the size alignment to a user equipment, wherein the size alignment is based on a rule which is known by the base station and the user equipment beforehand.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
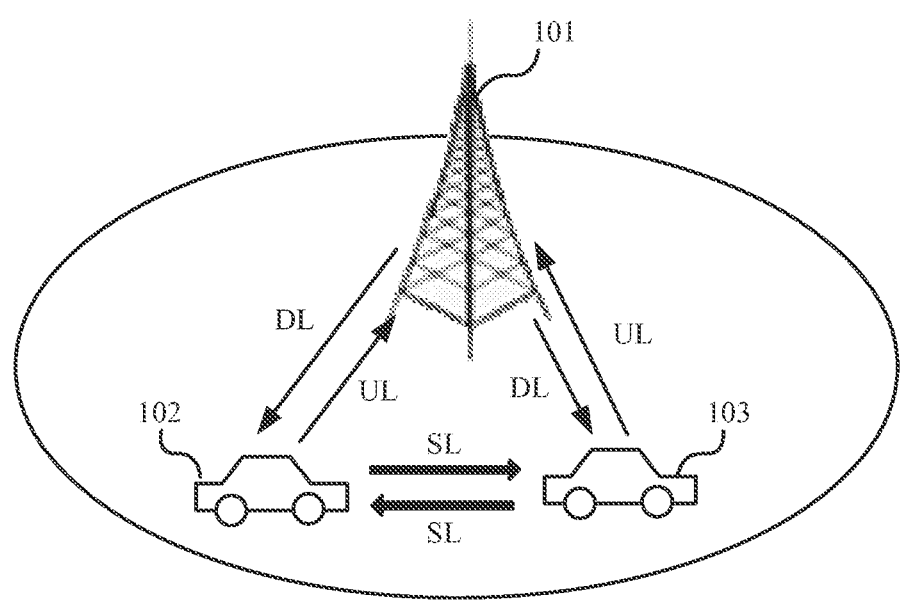
FIG. 1 schematically shows an exemplary scenario in which sidelink resources are dynamically scheduled by an eNodeB for V2V communication.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

As described above, sidelink SPS and the dedicated DCI format thereof, which is also referred to be as sidelink SPS DCI format, are under discussion in 3GPP. Specifically, two additional fields are suggested to be added to the sidelink DCI format which is used for dynamic scheduling of V2V/V2X (Vehicle to anything) traffic. In the following, Table 1 shows detailed design of the suggested sidelink SPS DCI format with respect to different bandwidths of carries to be scheduled. Here the assumption is SL SPS configuration index is 3 bits and Activation/release indication is 1 bit based on working assumption in 3GPP but in the end the size of these fields may be modified.

In Table 1, the first four table cells in the first column indicate contents (i.e. fields) contained in the existing sidelink DCI format used for dynamic scheduling based on 3GPP TS 36.312. Specifically, these contents are "Carrier indicator", "Lowest index of the subchannel allocation", "Frequency resource location" and "Time gap between initial transmission and retransmission". For different bandwidths of carriers to be scheduled, sizes of some of these fields are different and sizes of others of these fields are the same. For example, Table 1 shows six different bandwidths, that is, 1.4 MHZ, 3 MHZ, 5 MHZ, 10 MHz, 15 MHz, 20 MHz. The size of "Carrier indicator" is 3 bits for all of these six bandwidths, and the size of "Time gap between initial transmission and retransmission" is 4 bits for all of these six bandwidths. In contrast, the sizes of "Lowest index of the subchannel allocation" are 0 bits, 2 bits, 3 bits, 4 bits, 4 bits and 5 bits for bandwidths of 1.4 MHZ, 3 MHz, 5 MHz, 10 MHz, 15 MHz and 20 MHz respectively. Also, the size of "Frequency resource location" changes per bandwidth of the carrier to be scheduled as shown in Table 1.

In Table 1, the fifth and sixth table cells in the first column indicate the suggested two additional fields for sidelink (SL) SPS as described above. Specifically, these two additional fields are "SL SPS configuration index" and "Activation/release indication". They both are assumed to have fixed sizes (3 bits and 1 bit respectively) for different bandwidths of carriers to be scheduled.

The last two rows in Table 1 respectively shows the total payloads sizes (i.e. the total number of bits) and assumed subchannel sizes (i.e. the number of PRBs (Physical Resource Blocks)) of the designed sidelink SPS DCI format for different bandwidths of carriers to be scheduled. Apparently, due to the two additional fields, the total payload size of the sidelink SPS DCI will be larger than that of sidelink DCI for dynamical scheduling.

Although the above description is made by taking V2V/V2X communication, a vehicle may also be understood as a UE. That is to say, the direct communication between two UEs is performed via sidelink between them and may be scheduled by a base station/eNodeB through the sidelink DCI as described above. Simultaneously, there may be communication between the UE and the eNodeB and such communication is generally scheduled by the eNodeB via conventional DCI format such as DCI format 0, DCI format

TABLE 1

The design of sidelink SPS DCI format

| | Bandwith | | | | | |
|---|---|---|---|---|---|---|
| | 1.4 MHz | 3 MHz | 5 MHz | 10 MHz | 15 MHz | 20 MHz |
| Carrier indicator | 3 | 3 | 3 | 3 | 3 | 3 |
| Lowest index of the subchannel allocation | 0 | 2 | 3 | 4 | 4 | 5 |
| Frequency resource location | 0 | 3 | 4 | 6 | 7 | 8 |
| Time gap between initial transmission and retransmission | 4 | 4 | 4 | 4 | 4 | 4 |
| SL SPS configuration index | 3 | 3 | 3 | 3 | 3 | 3 |
| Activation/release indication | 1 | 1 | 1 | 1 | 1 | 1 |
| Total payload size [bit] | 11 | 16 | 18 | 21 | 22 | 24 |
| Assumption on subchannel size in terms of PRB | 6 | 5 | 5 | 5 | 5 | 5 |

1A and so on. For the purpose of explanation, these DCIs for scheduling transmission between the UE and the eNodeB are referred to be as Uu (User Equipment to Radio Network System) DCIs.

Since for a UE, sidelink communication with another UE and uplink/downlink communication with the eNodeB may both occurs, in a same search space, sidelink DCIs and Uu DCIs as described above may appear simultaneously and need to be blindly detected/decoded at the UE side. In this case, if the size of a sidelink DCI is different from each of Uu DCIs, the blind detection/decoding times at the UE side will be increased due to introducing SL DCIs. For example, Table 2 shows contents and DCI size of DCI format 0 with respect to different bandwidths of carriers to be scheduled.

TABLE 2

Contents and DCI size of DCI format 0

| | Bandwidth | | | | | |
|---|---|---|---|---|---|---|
| | 1.4 MHz | 3 MHz | 5 MHz | 10 MHz | 15 MHz | 20 MHz |
| Carrier indicator | 3 | 3 | 3 | 3 | 3 | 3 |
| Flag for format0/format1A differentiation | 1 | 1 | 1 | 1 | 1 | 1 |
| Hopping flag/RA Type 1 MSB | 1 | 1 | 1 | 1 | 1 | 1 |
| Resource block assignment and hopping resource allocation | 5 | 7 | 9 | 11 | 12 | 13 |
| Modulation and coding scheme and redundancy version | 5 | 5 | 5 | 5 | 5 | 5 |
| New data indicator | 1 | 1 | 1 | 1 | 1 | 1 |
| TPC command for scheduled PUSCH | 2 | 2 | 2 | 2 | 2 | 2 |
| Cyclic shift for DM RS and OCC index | 3 | 3 | 3 | 3 | 3 | 3 |
| UL index or Downlink Assignment Index (DAI) | 0 | 0 | 0 | 0 | 0 | 0 |
| CSI request | 1 | 1 | 1 | 1 | 1 | 1 |
| SRS request | 0 | 0 | 0 | 0 | 0 | 0 |
| Resource allocation type | 1 | 1 | 1 | 1 | 1 | 1 |
| Total payload size [bit] | 23 | 25 | 27 | 29 | 30 | 31 |

Here, since fields contained in DCI format 0 and their respective sizes are well known for those skilled in the art, the details thereof is omitted for avoiding confusion of the inventive point of the present disclosure. In Table 2, the last row shows total payload sizes of DCI format 0 are 23 bits, 25 bits, 27 bits, 29 bits, 30 bits and 31 bits for different bandwidths of 1.4 MHz, 3 MHz, 5 MHz, 10 MHz, 15 MHz and 20 MHz respectively.

Although not shown in Table 1, it can be derived from contents given in Table 1 that total payload sizes of sidelink DCI format for dynamical scheduling are 7 bits, 12 bits, 14 bits, 17 bits, 18 bits and 20 bits for different bandwidths of 1.4 MHZ, 3 MHZ, 5 MHz, 10 MHZ, 15 MHz and 20 MHz respectively. By comparison between DCI format 0 and the sidelink DCI format for dynamical scheduling, it can be seen that the size of the sidelink DCI format for dynamical scheduling is smaller than that of DCI format 0. Thus, based on the current specification and agreement, zero bits are padded to the sidelink DCI format for dynamical scheduling so as to align the size thereof to that of DCI format 0. Thereby, blind detection (decoding) times at UE side can be reduced.

However, as described above, due to two additional fields as shown in Table 1, the total payload size of the sidelink SPS DCI will be larger than that of sidelink DCI for dynamical scheduling by for example 4 bits for each bandwidth as shown in Table 1. Thus, by comparison between DCI format 0 and the sidelink SPS DCI format, there is possibility that the size of sidelink SPS DCI format is larger than that of DCI format 0. For the purpose of understanding easily, Table 3 shows size comparison between SL SPS DCI and DCI format 0.

TABLE 3 size comparison between SL SPS DCI and DCI format 0

| SL SPS DCI\DCI format 0 | | Bandwidth for DCI format 0 | | | | | |
|---|---|---|---|---|---|---|---|
| | | 1.4 MHz | 3 MHz | 5 MHz | 10 MHz | 15 MHz | 20 MHz |
| Bandwidth for SL SPS DCI | 1.4 MHz | 11\23 | 11\25 | 11\27 | 11\29 | 11\30 | 11\31 |
| | 3 MHz | 16\23 | 16\25 | 16\27 | 16\29 | 16\30 | 16\31 |
| | 5 MHz | 18\23 | 18\25 | 18\27 | 18\29 | 18\30 | 18\31 |
| | 10 MHz | 21\23 | 21\25 | 21\27 | 21\29 | 21\30 | 21\31 |
| | 15 MHz | 22\23 | 22\25 | 22\27 | 22\29 | 22\30 | 22\31 |
| | 20 MHz | 24\23 | 24\25 | 24\27 | 24\29 | 24\30 | 24\31 |

As shown in Table 3, in each table cell containing two numbers, the number at left side of "\" indicates the size (total payload size) of SL SPS DCI for a certain bandwidth of carrier to be scheduled, and the number at right side of "\" indicates the size (total payload size) of DCI format 0 for the certain bandwidth of carrier to be scheduled. It can be seen from Table 3 that in a case that SL SPS DCI is used to schedule a carrier of bandwidth of 20 MHz and DCI format 0 is used to schedule a carrier of bandwidth of 1.4 MHZ, the size (24 bits) of SL SPS DCI is larger than the size (23 bits) of DCI format 0, as shown in the table cell "24/23". Since the current specification and agreement only consider the case that the size of the sidelink DCI format for dynamical scheduling is smaller than that of DCI format 0, UE behavior is unclear when the size of SL SPS DCI is larger than the size of DCI format 0.

Furthermore, in LTE (Long Term Evolution), it is known that DCI format 0 and DCI format 1A (as well as format 3/3A) are padded to each other in order for size alignment. However, DCI format 0 and DCI format 1A are only related to size alignment between two DCIs. Until now, it is unclear how to handle the size alignment in cases that there are more than two DCIs including at least one sidelink DCI and at least one Uu DCI. For example, the size of a sidelink DCI may be smaller than that of one Uu DCI but larger than that of another Uu DCI.

In addition, in NR (New Radio access technology) or 5G (The fifth Generation) system, sidelink DCIs and Uu DCIs may also appear in a same search space similarly as in cases described above, and how to implement the size alignment between DCIs needs to be considered too.

Figure 2:
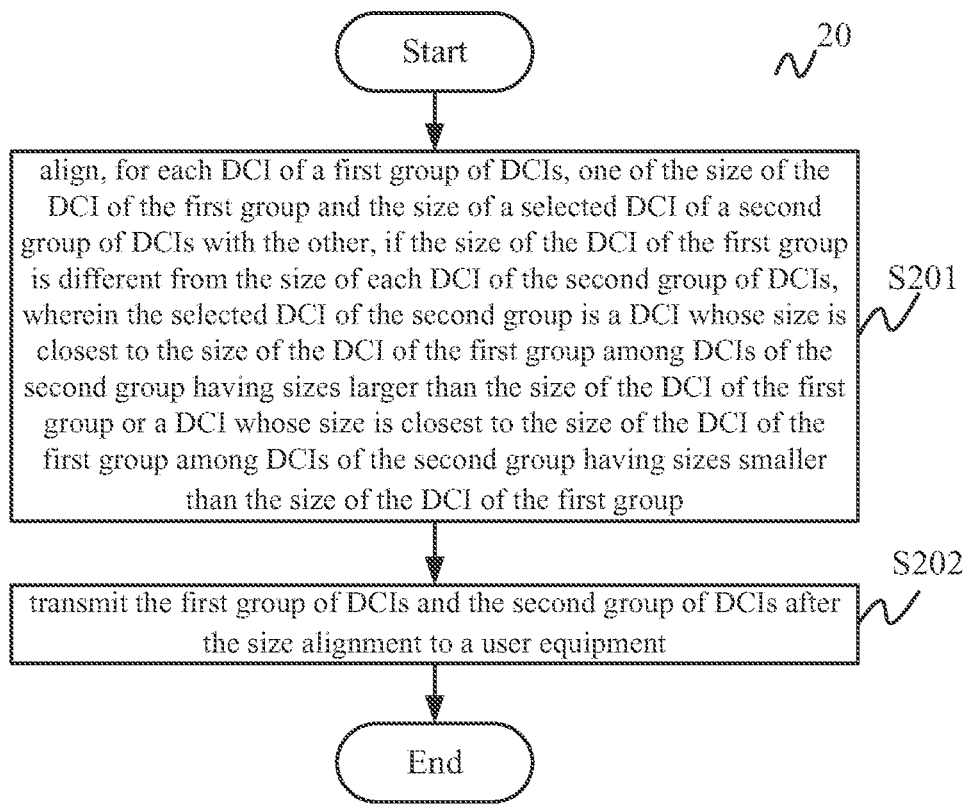
FIG. 2 illustrates a flowchart of a wireless communication method for a base station according to an embodiment of the present disclosure.

In an embodiment of the present disclosure, there is provided a wireless communication method 20 for a base station as shown in FIG. 2. FIG. 2 illustrates a flowchart of a wireless communication method 20 for a base station according to an embodiment of the present disclosure.

As shown in FIG. 2, the wireless communication method 20 starts at step S201 in which, for each DCI of a first group of DCIs, one of the size of the DCI of the first group and the size of a selected DCI of a second group of DCIs is aligned with the other, if the size of the DCI of the first group is different from the size of each DCI of the second group of DCIs, wherein the selected DCI of the second group is a DCI whose size is closest to the size of the DCI of the first group among DCIs of the second group having sizes larger than the size of the DCI of the first group or a DCI whose size is closest to the size of the DCI of the first group among DCIs of the second group having sizes smaller than the size of the DCI of the first group. Then, at step S202, the first group of DCIs and the second group of DCIs after the size alignment are transmitted to a user equipment. After step S202, the wireless communication method 20 ends. The size alignment is based on a rule which is known by the base station and the user equipment beforehand.

Specifically, for example, the base station may be eNodeB 101 as shown in FIG. 1 and the user equipment may be any one of vehicles 102 and 103 as shown in FIG. 1. That is to say, the wireless communication method 20 may be used by eNodeB 101 to schedule sidelink transmission and/or reception as well as uplink transmission and downlink reception of vehicles 102 and 103.

For the purpose of explanation, it may be assumed that the first group of DCIs are DCIs for scheduling sidelink transmission between the user equipment and another user equipment and that the second group of DCIs are DCIs for scheduling transmission between the user equipment and the base station. As described above, the first group of DCIs may be referred simply to be as SL DCIs and the second group of DCIs may be referred simply to be as Uu DCIs.

As described above, in a same search space, there may be at least one SL DCI and at least one Uu DCI and the size of the SL DCI may be smaller or larger than the Uu DCI in one case. In another case, in a same search space, there may be more than one SL DCIs and more than one Uu DCIs and the size relationship between the SL DCIs and Uu DCIs may be very complicated. If no size alignment of these DCIs is performed, there will be many kinds of sizes of DCIs, blind detection of these DCIs needs to be performed too many times at the user equipment in order to correctly detect these DCIs, which will result in time consuming and system load increasing.

At step S201, for each SL DCI, if the size of the SL DCI is different from that of each Uu DCI, the size alignment is performed between the SL DCI and an Uu DCI whose size is smallest among Uu DCIs having sizes larger than the SL DCI or an Uu DCI whose size is largest among Uu DCIs having sizes smaller than the SL DCI. Thus, firstly, the blind detection times at UE side can be reduced. Secondly, since the selected Uu DCI is an Uu DCI whose size is smallest among Uu DCIs having sizes larger than the SL DCI or an Uu DCI whose size is largest among Uu DCIs having sizes smaller than the SL DCI, the minimum size change of DCIs can be kept.

In addition, since the rule on which the size alignment is based is known by the base station and the user equipment beforehand, UE may blindly detect these DCIs after the size alignment by the base station based on the rule. The rule may be predefined in a standard. Alternatively, the rule may also be defined by the base station, and the base station needs to notify UE of the rule for example via upper-layer signaling before UE performs the blind detection of DCIs. Apparently, the definition manner of the rule may also be any other suitable manner and the present disclosure is not limited to the above two manners.

When there are more than one SL DCIs and more than one Uu DCIs, different SL DCIs may be aligned with different Uu DCIs. Specific examples of the size alignment between SL DCIs and Uu DCIs will be further given later for facilitating understanding the wireless communication method 20.

With the wireless communication method 20, by performing the size alignment between each DCI of the first group of DCIs and the selected DCI of the second group whose size is closest to that of the each DCI of the first group, blind detection times at the user equipment can be reduced while minimizing the size change of DCIs.

According to an embodiment of the present disclosure, in the wireless communication method 20 as shown in FIG. 2, the selected DCI of the second group is a DCI whose size is closest to the size of the DCI of the first group among DCIs of the second group having sizes larger than the size of the DCI of the first group. And, although not shown in FIG. 2, in step S201, aligning one of the size of the DCI of the first group and the size of the selected DCI of a second group of DCIs with the other may comprises a sub-step of increasing bits in the DCI of the first group, wherein the number of the increased bits equals to the difference between the size of the DCI of the first group and that of the selected DCI of the second group.

Specifically, in a first example, it is assumed that a UE is configured with TM (Transmission Mode) 10 and is expected to decode DCI format 0 and DCI format 2D for an Uu channel of bandwidth of 1.4 MHz and to decode SL SPS DCI for a sidelink channel of bandwidth of 20 MHz. That is to say, the first group of DCIs includes only one SL DCI, that is, SL SPS DCI as shown in Table 1, and the second group of DCIs includes two Uu DCIs, that is, DCI format 0 as shown in Table 2 and DCI format 2D. Table 4 shows the design (contents/fields and size) of DCI format 2D for the bandwidth of 1.4 MHz.

TABLE 4

The design of DCI format 2D

| Field Name | Field Size [bit] | Total Payload Size [bit] |
| --- | --- | --- |
| Carrier indicator | 3 | 35 |
| Resource allocation header | 0 | |
| Resource block assignment | 6 | |
| TPC command for PUCCH | 2 | |
| Downlink Assignment Index | 0 | |
| HARQ process number | 3 | |
| Antenna port(s), scrambling identity and number of layers | 3 | |
| SRS request | 0 | |

TABLE 4-continued

The design of DCI format 2D

| Field Name | Field Size [bit] | Total Payload Size [bit] |
|---|---|---|
| TB1 Modulation and coding scheme | 5 | |
| TB1 New data indicator | 1 | |
| TB1 Redundancy version | 2 | |
| TB2 Modulation and coding scheme | 5 | |
| TB2 New data indicator | 1 | |
| TB2 Redundancy version | 2 | |
| PDSCH RE Mapping and Quasi-Co-Location Indicator | 2 | |
| HARQ-ACK resource offset | 0 | |

Based on Table 1, the size of SL SPS DCI is 24 bits for the bandwidth of 20 MHz. Based on Table 2, the size of DCI format 0 is 23 bits for the bandwidth of 1.4 MHz. In addition, based on Table 4, the size of DCI format 2D is 35 bits for the bandwidth of 1.4 MHz. Since DCI format 2D is well known by those skilled in the art, the detailed design thereof for other bandwidths will not be given here for avoiding confusion of the inventive point of the present disclosure. In this case, the size of SL SPS DCI is larger than that of DCI format 0 and smaller than that of DCI format 2D. It is possible to increase bits in SL SPS DCI by 11 bits to align the size of SL SPS DCI with that of DCI format 2D. Thereby, blind detection times at UE side are not increased due to introducing SPS SL DCI, meanwhile the two Uu DCIs (DCI format 0 and DCI format 2D) are not impacted in all respects of size, content and coverage.

By increasing bits in the DCI of the first group to align the size of the DCI of the first group with the selected DCI of the second group, blind detection times at the user equipment can be reduced without impacting the second group of DCIs.

According to an embodiment of the present disclosure, in the wireless communication method 20 as shown in FIG. 2, although not shown in FIG. 2, the above sub-step may comprise: padding bits to the DCI of the first group or increasing CRC (Cyclic Redundancy Check) size in the DCI of the first group.

Specifically, in the first example, SL SPS DCI may be padded with 11 "0" bits to align with DCI format 2D. It is noted that the padded bits are not limited to "0", and may be "1" or any other suitable bits.

Alternatively, it is also possible to increase CRC size in SL SPS DCI by 11 bits to align with DCI format 2D. In this case, by increasing CRC size, the accuracy and integrity of data transmission will be further improved while reducing blind detection times at UE side.

It is noted that, the above manners of increasing bits in the DCI of the first group so as to align with the selected DCI of the second group are only examples, the present disclosure is not limited thereto, and those skilled in the art may employ any other suitable manners.

According to an embodiment of the present disclosure, in the wireless communication method 20 as shown in FIG. 2, the selected DCI of the second group is a DCI whose size is closest to the size of the DCI of the first group among DCIs of the second group having sizes smaller than the size of the DCI of the first group. And, although not shown in FIG. 2, in step S201, aligning one of the size of the DCI of the first group and the size of the selected DCI of a second group of DCIs with the other may comprises a sub-step of reducing bits in the DCI of the first group, wherein the number of the reduced bits equals to the difference between the size of the DCI of the first group and that of the selected DCI of the second group.

For convenience of understanding, the above first example is still taken as an example. Although the size of SL SPS DCI is aligned with that of DCI format 2D in the above description, the present disclosure is not limited thereto. It is also possible to align the size of SL SPS DCI with that of DCI format 0 by reducing 1 bit in SL SPS DCI. Similarly, blind detection times at UE side are not increased due to introducing SPS SL DCI, meanwhile the two Uu DCIs (DCI format 0 and DCI format 2D) are not impacted in all respects of size, content and coverage.

Thus, by reducing bits in the DCI of the first group to align the size of the DCI of the first group with the selected DCI of the second group, blind detection times at the user equipment can be reduced without impacting the second group of DCIs.

According to an embodiment of the present disclosure, in the wireless communication method 20 as shown in FIG. 2, although not shown in FIG. 2, the above sub-step may comprise: restricting the number of bits in at least one field in the DCI of the first group or by increasing the granularity of resource allocation in the DCI of the first group.

Specifically, it is possible to specify, for example in a standard, some restriction on field usage in SL DCI for some special case, for example, when SL refers to a larger bandwidth such as 20 MHz and Uu refers to a smaller bandwidth such as 1.4 MHz. More specifically, in the first example, since SL SPS DCI refers to sidelink channel of bandwidth of 20 MHz and two Uu DCIs refer to Uu channel of bandwidth of 1.4 MHZ, it can be specified that the field of "SPS configuration index" in SL SPS DCI is squeezed to 2 bits from the default 3 bits as shown in Table 1. Thereby, the total payload size of SL SPS DCI can be reduced to be 23 bits which is equivalent to that of DCI format 0.

Alternatively, since the larger the granularity of resource allocation in DCI, the smaller the size of the DCI, the granularity of resource allocation in SL SPS DCI may be increased to reduce 1 bit in SL SPS DCI. More specifically, the configured sub-channel size should be larger than 6 PRBs for SL SPS DCI in the first example for example.

It is noted that, the above manners of reducing bits in the DCI of the first group so as to align with the selected DCI of the second group are only examples, the present disclosure is not limited thereto, and those skilled in the art may employ any other suitable manners.

The above first example only gives a simple case in which there is only one SL DCI. In the following, a more complicated case is given by a second example. In the second example, it is assumed that a UE is to receive two Uu uplink DCIs in which one is used for CP-OFDM (Cyclic Prefix-Orthogonal Frequency Division Multiplexing) based uplink transmission and the other is used for DFT-S-OFDM (Discrete Fourier Transform-Spread-OFDM) based uplink transmission. And, the UE is also assumed to receive two SL DCIs in which one is used for dynamic scheduling and the other is used for SL SPS.

In order for convenience of explanation, the two Uu DCIs are represented by DCI1_uu and DCI2_uu and the two SL DCIs are indicated by DCI3_SL and DCI4_SL. In addition, the size relation of these four DCIs can be expressed as DCI1_uu>DCI4_SL>DCI2_uu>DCI3_SL. In this case, based on the wireless communication method 40 shown in FIG. 2, one option is to align the size of DCI4_SL with that of DCI1_uu by for example padding bits to DCI4_SL and to align the size of DCI3_SL with that of DCI2_uu by for example padding bits to DCI3_SL. Thereby, as described above, different SL DCIs are aligned with different Uu DCIs.

It is known that padding more bits will result in increased overhead and increased error rate. Since DCI4_SL is aligned with its smallest larger Uu DCI (i.e. DCI1_uu) meanwhile DCI3_SL is aligned with its smallest larger Uu DCI (i.e. DCI2_uu), minimum bits padded to each SL DCI can be kept. Thereby, the size increase of SL DCIs is minimized. Meanwhile, blind detection times at UE side are also not changed compared with the case without SL DCIs.

Similarly with the first example, in the second example, the another option may be to align DCI4_SL with that of its largest smaller Uu DCI (i.e. DCI2_uu) by reducing bits in DCI4_SL and to align the size of DCI3_SL with that of its smallest larger Uu DCI (i.e. DCI2_uu) by increasing bits in DCI3_SL.

In the above first and second examples, the size of SL DCI is aligned with that of Uu DCI by either increasing or reducing bits in SL DCI. However, the present disclosure is not limited thereto. In NR/5G cases, it is also possible to align the size of Uu DCI with that of SL DCI.

According to an embodiment of the present disclosure, in the wireless communication method 20 as shown in FIG. 2, the selected DCI of the second group is a DCI whose size is closest to the size of the DCI of the first group among DCIs of the second group having sizes smaller than the size of the DCI of the first group. And, although not shown in FIG. 2, in step S201, aligning one of the size of the DCI of the first group and the size of the selected DCI of a second group of DCIs with the other may comprises a sub-step of adding bits to the selected DCI of the second group, wherein the number of the added bits equals to the difference between the size of the DCI of the first group and that of the selected DCI of the second group.

For convenience of understanding, the description is made based on a third example. In the third example, it is assumed that a UE is to receive two Uu DCIs in which one is TM specific DCI and the other is fallback DCI. And, the UE is also assumed to receive two SL DCIs in which one is used for dynamic scheduling and the other is used for SL SPS.

In order to convenience of explanation, as in the second example, the two Uu DCIs are also represented by DCI1_uu and DCI2_uu and the two SL DCIs are also indicated by DCI3_SL and DCI4_SL. Different from the second example, in the third example, the size relation of these four DCIs can be expressed as DCI4_SL>DCI3_SL>DCI1_uu>DCI2_uu. In this case, based on the above sub-step, firstly, for DCI4_SL, since DCI1_uu is the largest smaller Uu DCI, it is possible to align the size of DCI1_uu with that of DCI4_SL by adding bits to DCI1_uu, which is different from the above first and second examples. Secondly, for DCI3_SL, since DCI1_uu is also the largest smaller Uu DCI, the size alignment should also be performed between DCI3_SL and DCI1_uu, which is equivalent to that the size of DCI3_SL is aligned with that of DCI4_SL by increasing bits in DCI3_SL. In summary, both the size of DCI1_uu and the size of DCI3_SL are aligned with that of DCI4_SL. Thereby, the fallback DCI (DCI2_uu) keeps unchanged, that is to say, the content, size and coverage thereof is kept. Meanwhile, by aligning both the size of DCI1_uu and the size of DCI3_SL with that of DCI4_SL, blind detection times at UE side can be reduced.

Alternatively, another option for the third example may be aligning the sizes of all of DCI3_SL, DCI1_uu and DCI2_uu with that of DCI4_SL. In this case, the blind detection times at UE side may be smallest.

Based on the third example, it can be seen that all of Uu DCIs or at least TM specific Uu DCIs is aligned in size with the largest SL DCI if none of Uu DCIs has larger size than that of any SL DCI. However, this is only two possible manner of size alignment of DCIs, the present disclosure is not limited thereto, and those skilled in the art may employ any other suitable manner size alignment of DCIs. For example, both the size of DCI1_uu and the size of DCI2_uu or only the size of DCI1_uu may be aligned with DCI3_SL by adding bits thereto, meanwhile the size of DCI4_SL may be aligned with that of DCI3_SL by reducing bits in DCI4_SL.

Thus, by adding bits to the selected DCI of the second group to align the size of the selected DCI of the second group with the DCI of the first group, blind detection times at the user equipment can be reduced.

According to an embodiment of the present disclosure, in the wireless communication method 20 as shown in FIG. 2, although not shown in FIG. 2, the above sub-step may comprise: padding bits to the selected DCI of the second group or increasing the number of bits in at least one field in the selected DCI.

For example, in the third example, it is possible to pad bits such as "0", "1" or any other bits to DCI1_uu so as to align the size of DCI1_uu with that of DCI4_uu. Also, for the another option as described above, it is possible to pad bits such as "0", "1" or any other bits to DCI2_uu so as to align the size of DCI2_uu with that of DCI4_uu.

Alternatively, as for SL DCI, it is also possible to specify, for example in a standard, some restriction on field usage in Uu DCI for some special case, for example, when SL refers to larger bandwidth such as 20 MHz and Uu refers to smaller bandwidth such as 1.4 MHz. More specifically, it can be specified that only 2 or 3 bits instead of default 1 bit can be configured for the field of "CSI request" in this case. Thereby, the number of bits in Uu DCI may be increased. Also, similarly with SL DCI, it is also possible to increase CRC size in Uu DCI so as to add bits to Uu DCI.

Furthermore, a fourth example as an extension to the first example and a general case is further described below for facilitating understanding of the present disclosure. In the fourth example, a UE is assumed to receive at least two Uu DCIs represented as DCI1_uu and DCI2_uu, and to receive at least one SL DCI indicated by DCI3_SL. there are at least three possible size relations among these three DCIs. The first size relation is assumed to be DCI1_uu>DCI3_SL>DCI2_uu, which corresponds to the case in the first example for instance. In this case, as described above, one option is to align the size of DCI3_SL with that of DCI1_uu by increasing bits in DCI3_SL. Another option is to align the size of DCI3_SL with that of DCI2_uu by reducing bits in DCI3_SL. A further option is to align the size of DCI2_uu with that of DCI3_SL by adding bits to DCI2_uu.

The second size relation is assumed to be DCI1_uu>DCI2_uu>DCI3_SL. In this case, the size of DCI3_SL is aligned with that of DCI2_uu by increasing bits in DCI3_SL.

The third size relation is assumed to be DCI3_SL>DCI1_uu>DCI2_uu. In this case, one option is to align the size of DCI1_uu with that of DCI3_SL by adding bits to DCI1_uu. Another option is to align the size of DCI3_SL with that of DCI1_uu by reducing bits in DCI3_SL. For the one option, it is also possible to further align the size of DCI2_uu with that of DCI3_SL by adding bits to DCI2_uu, which will results in smallest times of blind detection at UE side.

It is noted that, although SL DCIs and Uu DCIs are described in the above examples, the present disclosure is not limited thereto, the first group of DCIs can be other types of DCIs than SL DCIs and the second group of DCIs can be other types of DCIs than Uu DCIs. Also, although not given in the above, the selected DCI of the second group may also be aligned with that of the DCI of the first group by reducing bits depending on specific cases.

In the above, the wireless communication method 20 is described in detail with reference to FIGS. 1-2. With the wireless communication method 20, by performing the size alignment between each DCI of the first group of DCIs and the selected DCI of the second group whose size is closest to that of the each DCI of the first group, blind detection times at the user equipment can be reduced while minimizing the size change of DCIs.

Figure 3:
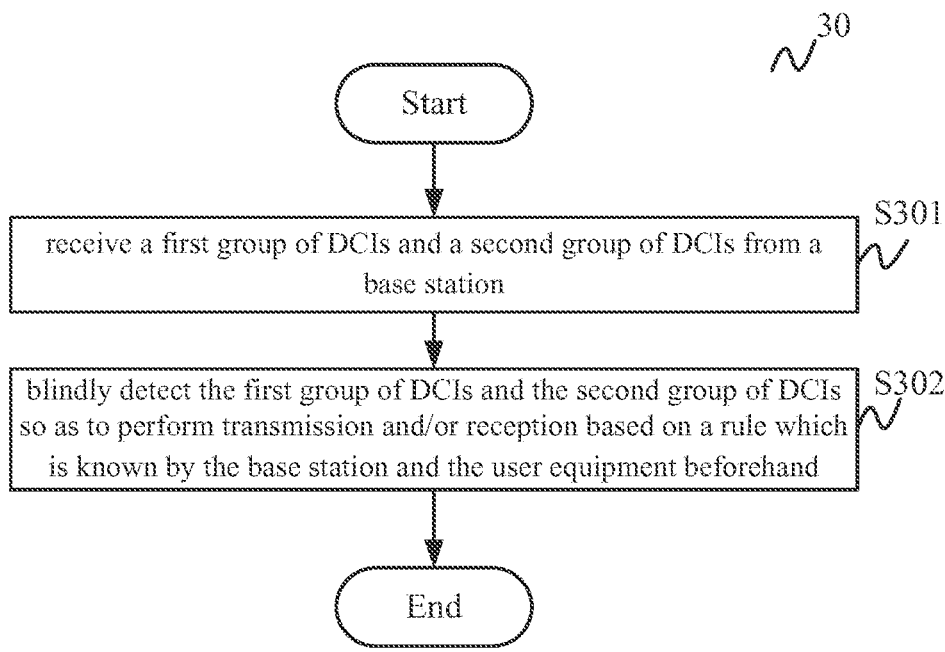
FIG. 3 illustrates a flowchart of a wireless communication method for a user equipment according to another embodiment of the present disclosure.

In another embodiment of the present disclosure, there is provided a wireless communication method 30 for a user equipment as shown in FIG. 3. FIG. 3 illustrates a flowchart of a wireless communication method 30 for a user equipment according to another embodiment of the present disclosure.

As shown in FIG. 3, the wireless communication method 30 starts at step S301 in which a first group of DCIs and a second group of DCIs is received from a base station. Then, at step S302, the first group of DCIs and the second group of DCIs is detected blindly so as to perform transmission and/or reception based on a rule which is known by the base station and the user equipment beforehand. After step S702, the wireless communication method 30 ends. Said rule indicates that before being received by the user equipment, the first group of DCIs and the second group of DCIs has been subject to size alignment comprising: aligning, for each DCI of the first group of DCIs, one of the size of the DCI of the first group and the size of a selected DCI of the second group of DCIs with the other based on said rule, if the size of the DCI of the first group is different from the size of each DCI of the second group of DCIs, wherein the selected DCI of the second group is a DCI whose size is closest to the size of the DCI of the first group among DCIs of the second group having sizes larger than the size of the DCI of the first group or a DCI whose size is closest to the size of the DCI of the first group among DCIs of the second group having sizes smaller than the size of the DCI of the first group. For example, the wireless communication method 30 may be applied to vehicles 102 and 130 as shown in FIG. 1.

According to an embodiment of the present disclosure, in the wireless communication method 30 as shown in FIG. 3, the selected DCI of the second group is a DCI whose size is closest to the size of the DCI of the first group among DCIs of the second group having sizes larger than the size of the DCI of the first group, and said aligning one of the size of the DCI of the first group and the size of the selected DCI of a second group of DCIs with the other comprises: increasing bits in the DCI of the first group, and the number of the increased bits equals to the difference between the size of the DCI of the first group and that of the selected DCI of the second group.

According to an embodiment of the present disclosure, in the wireless communication method 30 as shown in FIG. 3, said increasing bits in the DCI of the first group comprises: padding bits to the DCI of the first group or increasing CRC size in the DCI of the first group.

According to an embodiment of the present disclosure, in the wireless communication method 30 as shown in FIG. 3, the selected DCI of the second group is a DCI whose size is closest to the size of the DCI of the first group among DCIs of the second group having sizes smaller than the size of the DCI of the first group, and said aligning one of the size of the DCI of the first group and the size of the selected DCI of a second group of DCIs with the other comprises: reducing bits in the DCI of the first group, and the number of the reduced bits equals to the difference between the size of the DCI of the first group and that of the selected DCI of the second group.

According to an embodiment of the present disclosure, in the wireless communication method 30 as shown in FIG. 3, said reducing bits in the DCI of the first group comprises: restricting the number of bits in at least one field in the DCI of the first group or increasing the granularity of resource allocation in the DCI of the first group.

According to an embodiment of the present disclosure, in the wireless communication method 30 as shown in FIG. 3, the selected DCI of the second group is a DCI whose size is closest to the size of the DCI of the first group among DCIs of the second group having sizes smaller than the size of the DCI of the first group, and said aligning one of the size of the DCI of the first group and the size of the selected DCI of a second group of DCIs with the other comprises: adding bits to the selected DCI of the second group, wherein the number of the added bits equals to the difference between the size of the DCI of the first group and that of the selected DCI of the second group.

According to an embodiment of the present disclosure, in the wireless communication method 30 as shown in FIG. 3, said adding bits to the selected DCI of the second group comprising: padding bits to the selected DCI of the second group or increasing the number of bits in at least one field in the selected DCI.

According to an embodiment of the present disclosure, in the wireless communication method 30 as shown in FIG. 3, the first group of DCIs are DCIs for scheduling sidelink transmission between the user equipment and another user equipment, and the second group of DCIs are DCIs for scheduling transmission between the user equipment and the base station.

With the wireless communication method 30, by performing the size alignment between each DCI of the first group of DCIs and the selected DCI of the second group whose size is closest to that of the each DCI of the first group, blind detection times at the user equipment can be reduced while minimizing the size change of DCIs.

Figure 4:
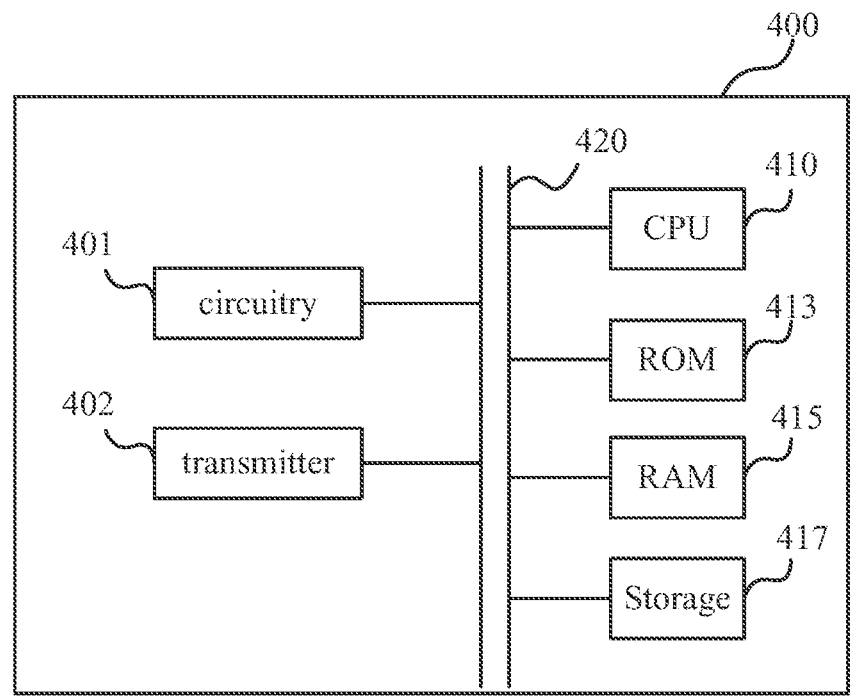
FIG. 4 illustrates a block diagram of a base station according to a further embodiment of the present disclosure.

In a further embodiment of the present disclosure, there is provided a base station 400 as shown in FIG. 4. FIG. 4 illustrates a block diagram of a base station 400 according to a further embodiment of the present disclosure.

As shown in FIG. 4, the base station 400 includes: a circuitry 401 operative to align, for each DCI (Downlink Control Information) of a first group of DCIs, one of the size of the DCI of the first group and the size of a selected DCI of a second group of DCIs with the other, if the size of the DCI of the first group is different from the size of each DCI of the second group of DCIs, wherein the selected DCI of the second group is a DCI whose size is closest to the size of the DCI of the first group among DCIs of the second group having sizes larger than the size of the DCI of the first group or a DCI whose size is closest to the size of the DCI of the first group among DCIs of the second group having sizes smaller than the size of the DCI of the first group; and a transmitter 402 operative to transmit the first group of DCIs and the second group of DCIs after the size alignment by the circuitry to a user equipment. The size alignment is based on a rule which is known by the base station and the user equipment beforehand.

The base station 400 according to the present embodiment may further include a CPU (Central Processing Unit) 410 for executing related programs to process various data and control operations of respective units in the base station 400, a ROM (Read Only Memory) 8413 for storing various programs required for performing various process and control by the CPU 410, a RAM (Random Access Memory) 415 for storing intermediate data temporarily produced in the procedure of process and control by the CPU 410, and/or a storage unit 417 for storing various programs, data and so on. The above circuitry 401, transmitter 402, CPU 410, ROM 413, RAM 415 and/or storage unit 417 etc. may be interconnected via data and/or command bus 420 and transfer signals between one another.

Respective units as described above do not limit the scope of the present disclosure. According to one embodiment of the disclosure, the functions of the above circuitry 401 and transmitter 402 may be implemented by hardware, and the above CPU 410, ROM 413, RAM 415 and/or storage unit 417 may not be necessary. Alternatively, part or all of functions of the above circuitry 401 or transmitter 402 may also be implemented by functional software in combination with the above CPU 410, ROM 413, RAM 415 and/or storage unit 417 etc.

Specifically, the base station 400 may be eNodeB 101 shown in FIG. 1 and may perform the wireless communication method 20 as described above in conjunction with FIG. 2.

With the base station 400, by performing the size alignment between each DCI of the first group of DCIs and the selected DCI of the second group whose size is closest to that of the each DCI of the first group, blind detection times at the user equipment can be reduced while minimizing the size change of DCIs.

Note that, the other technical features in the above wireless communication method 20 can also be incorporated in the base station 400 and will not be described here for avoid redundancy.

Figure 5:
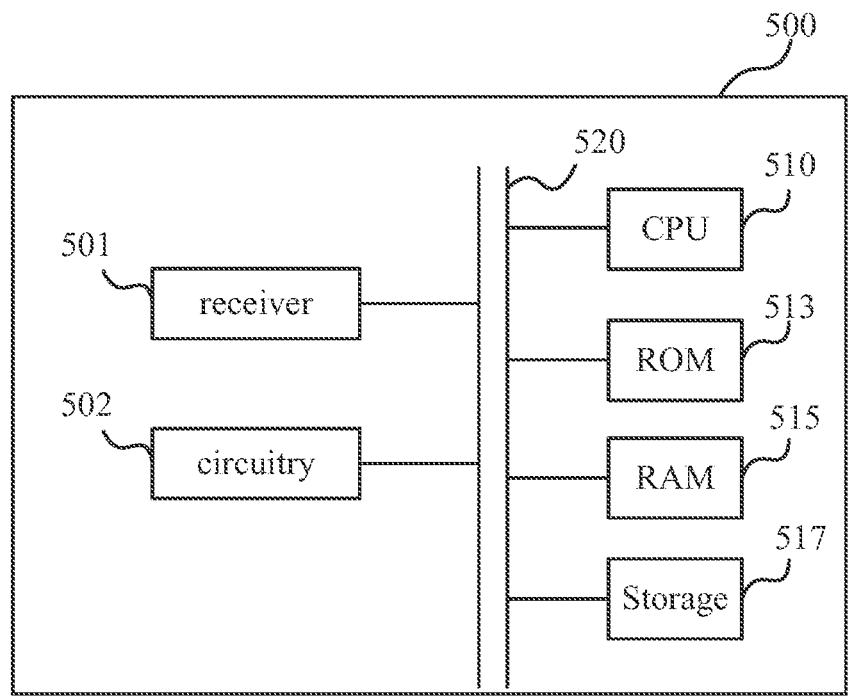
FIG. 5 illustrates a block diagram of a user equipment according to another embodiment of the present disclosure.

In another embodiment of the present disclosure, there is provided a user equipment 500 as shown in FIG. 5. FIG. 5 illustrates a block diagram of a user equipment 500 according to another embodiment of the present disclosure.

As shown in FIG. 5, the user equipment 500 includes: a receiver 501 operative to receive a first group of DCIs and a second group of DCIs from a base station; and a circuitry 302 operative to blindly detect the first group of DCIs and the second group of DCIs so as to perform transmission and/or reception based on a rule which is known by the base station and the user equipment beforehand. And, said rule indicates that before being received by the user equipment, the first group of DCIs and the second group of DCIs has been subject to size alignment comprising: aligning, for each DCI of the first group of DCIs, one of the size of the DCI of the first group and the size of a selected DCI of the second group of DCIs with the other based on said rule, if the size of the DCI of the first group is different from the size of each DCI of the second group of DCIs, wherein the selected DCI of the second group is a DCI whose size is closest to the size of the DCI of the first group among DCIs of the second group having sizes larger than the size of the DCI of the first group or a DCI whose size is closest to the size of the DCI of the first group among DCIs of the second group having sizes smaller than the size of the DCI of the first group.

The user equipment 500 according to the present embodiment may further include a CPU (Central Processing Unit) 510 for executing related programs to process various data and control operations of respective units in the user equipment 500, a ROM (Read Only Memory) 513 for storing various programs required for performing various process and control by the CPU 510, a RAM (Random Access Memory) 515 for storing intermediate data temporarily produced in the procedure of process and control by the CPU 510, and/or a storage unit 517 for storing various programs, data and so on. The above receiver 501, circuitry 502, CPU 510, ROM 513, RAM 515 and/or storage unit 517 etc. may be interconnected via data and/or command bus 520 and transfer signals between one another.

Respective units as described above do not limit the scope of the present disclosure. According to one embodiment of the disclosure, the functions of the above receiver 501 and circuitry 502 may be implemented by hardware, and the above CPU 510, ROM 513, RAM 515 and/or storage unit 517 may not be necessary. Alternatively, part or all of functions of the above receiver 501 and/or circuitry 502 may also be implemented by functional software in combination with the above CPU 510, ROM 513, RAM 515 and/or storage unit 517 etc.

Specifically, the user equipment 500 may be vehicles 102 and 103 shown in FIG. 1 and may perform the wireless communication method 30 as described above in conjunction with FIG. 3.

With the user equipment 500, by performing the size alignment between each DCI of the first group of DCIs and the selected DCI of the second group whose size is closest to that of the each DCI of the first group, blind detection times at the user equipment can be reduced while minimizing the size change of DCIs.

Note that, the other technical features in the above wireless communication method 30 can also be incorporated in the user equipment 500 and will not be described here for avoid redundancy.

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

It is noted that the present disclosure intends to be variously changed or modified by those skilled in the art based on the description presented in the specification and known technologies without departing from the content and the scope of the present disclosure, and such changes and applications fall within the scope that claimed to be protected. Furthermore, in a range not departing from the content of the disclosure, the constituent elements of the above-described embodiments may be arbitrarily combined.

Embodiments of the present disclosure can at least provide the following subject matters.

(1). A base station, comprising:
  circuitry operative to align, for each DCI (Downlink Control Information) of a first group of DCIs, one of the size of the DCI of the first group and the size of a selected DCI of a second group of DCIs with the other, if the size of the DCI of the first group is different from the size of each DCI of the second group of DCIs, wherein the selected DCI of the second group is a DCI whose size is closest to the size of the DCI of the first group among DCIs of the second group having sizes larger than the size of the DCI of the first group or a DCI whose size is closest to the size of the DCI of the first group among DCIs of the second group having sizes smaller than the size of the DCI of the first group; and
  a transmitter operative to transmit the first group of DCIs and the second group of DCIs after the size alignment by the circuitry to a user equipment,
  wherein the size alignment is based on a rule which is known by the base station and the user equipment beforehand.

(2). The base station according to (1), wherein the selected DCI of the second group is a DCI whose size is closest to the size of the DCI of the first group among DCIs of the second group having sizes larger than the size of the DCI of the first group, and
  wherein the circuitry further increases bits in the DCI of the first group, and the number of the increased bits equals to the difference between the size of the DCI of the first group and that of the selected DCI of the second group.

(3). The base station according to (2), wherein the circuitry increases bits in the DCI of the first group by padding bits or increasing CRC (Cyclic Redundancy Check) size.

(4). The base station according to (1), wherein the selected DCI of the second group is a DCI whose size is closest to the size of the DCI of the first group among DCIs of the second group having sizes smaller than the size of the DCI of the first group, and
  wherein the circuitry further reduces bits in the DCI of the first group, and the number of the reduced bits equals to the difference between the size of the DCI of the first group and that of the selected DCI of the second group.

(5). The base station according to (4), wherein the circuitry reduces bits in the DCI of the first group by restricting the number of bits in at least one field in the DCI of the first group or by increasing the granularity of resource allocation in the DCI of the first group.

(6). The base station according to (1), wherein the selected DCI of the second group is a DCI whose size is closest to the size of the DCI of the first group among DCIs of the second group having sizes smaller than the size of the DCI of the first group, and
  wherein the circuitry further adds bits to the selected DCI of the second group, and the number of the added bits equals to the difference between the size of the DCI of the first group and that of the selected DCI of the second group.

(7). The base station according to (6), wherein the circuitry adds bits to the selected DCI of the second group by padding bits or by increasing the number of bits in at least one field in the selected DCI.

(8). The base station according to (1), wherein the first group of DCIs are DCIs for scheduling sidelink transmission between the user equipment and another user equipment, and the second group of DCIs are DCIs for scheduling transmission between the user equipment and the base station.

(9). A user equipment, comprising:
  a receiver operative to receive a first group of DCIs and a second group of DCIs from a base station; and
  a circuitry operative to blindly detect the first group of DCIs and the second group of DCIs so as to perform transmission and/or reception based on a rule which is known by the base station and the user equipment beforehand,
  wherein said rule indicates that before being received by the user equipment, the first group of DCIs and the second group of DCIs has been subject to size alignment comprising: aligning, for each DCI of the first group of DCIs, one of the size of the DCI of the first group and the size of a selected DCI of the second group of DCIs with the other based on said rule, if the size of the DCI of the first group is different from the size of each DCI of the second group of DCIs, wherein the selected DCI of the second group is a DCI whose size is closest to the size of the DCI of the first group among DCIs of the second group having sizes larger than the size of the DCI of the first group or a DCI whose size is closest to the size of the DCI of the first group among DCIs of the second group having sizes smaller than the size of the DCI of the first group.

(10). The user equipment according to (9), wherein the selected DCI of the second group is a DCI whose size is closest to the size of the DCI of the first group among DCIs of the second group having sizes larger than the size of the DCI of the first group, and
  wherein said aligning one of the size of the DCI of the first group and the size of the selected DCI of a second group of DCIs with the other comprises:
  increasing bits in the DCI of the first group, and the number of the increased bits equals to the difference between the size of the DCI of the first group and that of the selected DCI of the second group.

(11). The user equipment according to (10), wherein said increasing bits in the DCI of the first group comprises:
  padding bits to the DCI of the first group or increasing CRC size in the DCI of the first group.

(12). The user equipment according to (9), wherein the selected DCI of the second group is a DCI whose size is closest to the size of the DCI of the first group among DCIs of the second group having sizes smaller than the size of the DCI of the first group, and
  wherein said aligning one of the size of the DCI of the first group and the size of the selected DCI of a second group of DCIs with the other comprises:
  reducing bits in the DCI of the first group, and the number of the reduced bits equals to the difference between the size of the DCI of the first group and that of the selected DCI of the second group.

(13). The user equipment according to (12), wherein said reducing bits in the DCI of the first group comprises:
  restricting the number of bits in at least one field in the DCI of the first group or increasing the granularity of resource allocation in the DCI of the first group.

(14). The user equipment according to (9), wherein the selected DCI of the second group is a DCI whose size is closest to the size of the DCI of the first group among DCIs of the second group having sizes smaller than the size of the DCI of the first group, and wherein said aligning one of the size of the DCI of the first group and the size of the selected DCI of a second group of DCIs with the other comprises:
adding bits to the selected DCI of the second group, wherein the number of the added bits equals to the difference between the size of the DCI of the first group and that of the selected DCI of the second group.

(15). The user equipment according to (14), wherein said adding bits to the selected DCI of the second group comprising:
padding bits to the selected DCI of the second group or increasing the number of bits in at least one field in the selected DCI.

(16). The user equipment according to (9), wherein the first group of DCIs are DCIs for scheduling sidelink transmission between the user equipment and another user equipment, and the second group of DCIs are DCIs for scheduling transmission between the user equipment and the base station.

(17). A wireless communication method for a base station, comprising:
aligning, for each DCI (Downlink Control Information) of a first group of DCIs, one of the size of the DCI of the first group and the size of a selected DCI of a second group of DCIs with the other, if the size of the DCI of the first group is different from the size of each DCI of the second group of DCIs, wherein the selected DCI of the second group is a DCI whose size is closest to the size of the DCI of the first group among DCIs of the second group having sizes larger than the size of the DCI of the first group or a DCI whose size is closest to the size of the DCI of the first group among DCIs of the second group having sizes smaller than the size of the DCI of the first group; and
transmitting the first group of DCIs and the second group of DCIs after the size alignment to a user equipment,
wherein the size alignment is based on a rule which is known by the base station and the user equipment beforehand.

(18). The wireless communication method according to (17), wherein the selected DCI of the second group is a DCI whose size is closest to the size of the DCI of the first group among DCIs of the second group having sizes larger than the size of the DCI of the first group, and
wherein said aligning one of the size of the DCI of the first group and the size of the selected DCI of a second group of DCIs with the other comprises:
increasing bits in the DCI of the first group, wherein the number of the increased bits equals to the difference between the size of the DCI of the first group and that of the selected DCI of the second group.

(19). The wireless communication method according to (18), wherein said increasing bits in the DCI of the first group comprises:
padding bits to the DCI of the first group or increasing CRC (Cyclic Redundancy Check) size in the DCI of the first group.

(20). The wireless communication method according to (17), wherein the selected DCI of the second group is a DCI whose size is closest to the size of the DCI of the first group among DCIs of the second group having sizes smaller than the size of the DCI of the first group, and
wherein said aligning one of the size of the DCI of the first group and the size of the selected DCI of a second group of DCIs with the other comprises:
reducing bits in the DCI of the first group, wherein the number of the reduced bits equals to the difference between the size of the DCI of the first group and that of the selected DCI of the second group.

(21). The wireless communication method according to (20), wherein said reducing bits in the DCI of the first group comprises:
restricting the number of bits in at least one field in the DCI of the first group or increasing the granularity of resource allocation in the DCI of the first group.

(22). The wireless communication method according to (17), wherein the selected DCI of the second group is a DCI whose size is closest to the size of the DCI of the first group among DCIs of the second group having sizes smaller than the size of the DCI of the first group, and
wherein said aligning one of the size of the DCI of the first group and the size of the selected DCI of a second group of DCIs with the other comprises:
adding bits to the selected DCI of the second group, wherein the number of the added bits equals to the difference between the size of the DCI of the first group and that of the selected DCI of the second group.

(23). The wireless communication method according to (22), wherein said adding bits to the selected DCI of the second group comprising:
padding bits to the selected DCI of the second group or increasing the number of bits in at least one field in the selected DCI.

(24). The wireless communication method according to (17), wherein the first group of DCIs are DCIs for scheduling sidelink transmission between the user equipment and another user equipment, and the second group of DCIs are DCIs for scheduling transmission between the user equipment and the base station.

(25). A wireless communication method for a user equipment, comprising:
receiving a first group of DCIs and a second group of DCIs from a base station; and
detecting blindly the first group of DCIs and the second group of DCIs so as to perform transmission and/or reception based on a rule which is known by the base station and the user equipment beforehand,
wherein said rule indicates that before being received by the user equipment, the first group of DCIs and the second group of DCIs has been subject to size alignment comprising: aligning, for each DCI of the first group of DCIs, one of the size of the DCI of the first group and the size of a selected DCI of the second group of DCIs with the other based on said rule, if the size of the DCI of the first group is different from the size of each DCI of the second group of DCIs, wherein the selected DCI of the second group is a DCI whose size is closest to the size of the DCI of the first group among DCIs of the second group having sizes larger than the size of the DCI of the first group or a DCI whose size is closest to the size of the DCI of the first group among DCIs of the second group having sizes smaller than the size of the DCI of the first group.

(26). The wireless communication method according to (25), wherein the selected DCI of the second group is a DCI whose size is closest to the size of the DCI of the first group among DCIs of the second group having sizes larger than the size of the DCI of the first group, and
wherein said aligning one of the size of the DCI of the first group and the size of the selected DCI of a second group of DCIs with the other comprises:
increasing bits in the DCI of the first group, and the number of the increased bits equals to the difference between the size of the DCI of the first group and that of the selected DCI of the second group.

(27). The wireless communication method according to (26), wherein said increasing bits in the DCI of the first group comprises:
padding bits to the DCI of the first group or increasing CRC size in the DCI of the first group.

(28). The wireless communication method according to (25), wherein the selected DCI of the second group is a DCI whose size is closest to the size of the DCI of the first group among DCIs of the second group having sizes smaller than the size of the DCI of the first group, and
wherein said aligning one of the size of the DCI of the first group and the size of the selected DCI of a second group of DCIs with the other comprises:
reducing bits in the DCI of the first group, and the number of the reduced bits equals to the difference between the size of the DCI of the first group and that of the selected DCI of the second group.

(29). The wireless communication method according to (28), wherein said reducing bits in the DCI of the first group comprises:
restricting the number of bits in at least one field in the DCI of the first group or increasing the granularity of resource allocation in the DCI of the first group.

(30). The wireless communication method according to (25), wherein the selected DCI of the second group is a DCI whose size is closest to the size of the DCI of the first group among DCIs of the second group having sizes smaller than the size of the DCI of the first group, and
wherein said aligning one of the size of the DCI of the first group and the size of the selected DCI of a second group of DCIs with the other comprises:
adding bits to the selected DCI of the second group, wherein the number of the added bits equals to the difference between the size of the DCI of the first group and that of the selected DCI of the second group.

(31). The wireless communication method according to (30), wherein said adding bits to the selected DCI of the second group comprising:
padding bits to the selected DCI of the second group or increasing the number of bits in at least one field in the selected DCI.

(32). The wireless communication method according to (25), wherein the first group of DCIs are DCIs for scheduling sidelink transmission between the user equipment and another user equipment, and the second group of DCIs are DCIs for scheduling transmission between the user equipment and the base station.

The invention claimed is:

1. A communication apparatus, comprising:
a receiver, which, in operation, receives, in a search space, downlink control information (DCI) with a first DCI format used for sidelink communications; and
circuitry, which is coupled to the receiver and which, in operation, performs a decoding process of the DCI by using a reference size;
wherein,
when a second DCI format used for base station communications is mapped on the search space and the second DCI format is larger than the first DCI format, the reference size for the search space is based on the second DCI format, and
when a third DCI format used for sidelink communications is mapped on the search space and the third DCI format is larger than the first DCI format, and the second DCI format larger than the third DCI format is not mapped on the search space, the reference size for the search space is based on the third DCI format.

2. The communication apparatus according to claim 1, wherein one of the first DCI format and the third DCI format is used for a dynamic scheduling and the other of the first DCI format and the third DCI format is used for a semi-persistent scheduling (SPS).

3. The communication apparatus according to claim 1, wherein a size of the second DCI format is a nearest size to a size of the first DCI format, the nearest size being equal to or greater than the size of the first DCI format.

4. The communication apparatus according to claim 1, wherein a size of the third DCI format is a nearest size to a size of the first DCI format, the nearest size being equal to or greater than the size of the first DCI format.

5. The communication apparatus according to claim 1, wherein zeros of padding bits are added to the first DCI format until a size of the first DCI format with the padding bits equals the reference size.

6. A communication method, comprising:
receiving, in a search space, downlink control information (DCI) with a first DCI format used for sidelink communications; and
performing a decoding process of the DCI by using a reference size;
wherein,
when a second DCI format used for base station communications is mapped on the search space and the second DCI format is larger than the first DCI format, the reference size for the search space is based on the second DCI format, and
when a third DCI format used for sidelink communications is mapped on the search space and the third DCI format is larger than the first DCI format, and the second DCI format larger than the third DCI format is not mapped on the search space, the reference size for the search space is based on the third DCI format.

7. The communication method according to claim 6, wherein one of the first DCI format and the third DCI format is used for a dynamic scheduling and the other of the first DCI format and the third DCI format is used for a semi-persistent scheduling (SPS).

8. The communication method according to claim 6, wherein a size of the second DCI format is a nearest size to a size of the first DCI format, the nearest size being equal to or greater than the size of the first DCI format.

9. The communication method according to claim 6, wherein a size of the third DCI format is a nearest size to a size of the first DCI format, the nearest size being equal to or greater than the size of the first DCI format.

10. The communication method according to claim 6, wherein zeros of padding bits are added to the first DCI format until a size of the first DCI format with the padding bits equals the reference size.

* * * * *